S. Shive,
Water Wheel,
No. 69,495.     Patented Oct. 1, 1867.
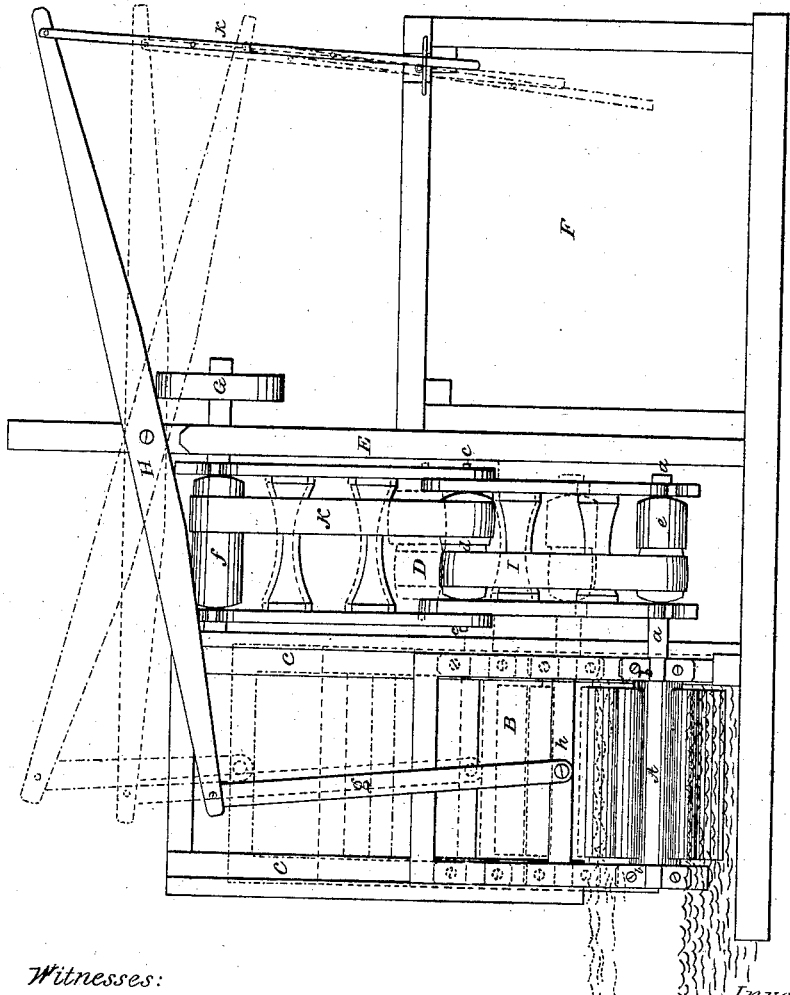
Witnesses:
Durlin Ourand,
William Wurz
Inventor:
Samuel Shive
by
Wiedersheim & Co
attys.

United States Patent Office.

SAMUEL SHIVE, OF FORKS, PENNSYLVANIA.

*Letters Patent No. 69,495, dated October 1, 1867.*

IMPROVEMENT IN WATER-WHEELS.

*The Schedule referred to in these Letters Patent and making part of the same.*

TO ALL WHOM IT MAY CONCERN:

Be it known that I, SAMUEL SHIVE, of Forks, in the county of Columbia, and State of Pennsylvania, have invented a new and useful Improvement in Water-Wheels; and I do hereby declare the following to be a clear and exact description of the nature thereof, sufficient to enable others skilled in the art to which it appertains to fully understand and use the same, reference being had to the accompanying drawings, making part of this specification, which represents a front view of the device, constructed according to my plan, showing the workings thereof in colors.

My invention consists of a wheel to be propelled by the force of the current of water, whether of the waste-ways of canals, rivers, or any swift streams, without dams, forebays, races, gates, or the like, whereby power is obtained at a small cost.

The wheel is mounted on a rising and falling frame, which is operated by suitable levers. The pulleys are so constructed that they will operate the same whether the wheel is raised or lowered, as will be hereinafter more fully described.

In the drawings, A represents an ordinary surface-wheel mounted on a shaft, $a$, whose bearings are in lugs or ears $b$ on a frame, B. This frame has a rising or falling motion, and slides in grooves in an upright framing, C, which extends out from the shore or bank of the stream. D represents a hinged or swinging-pulley frame, consisting of two or more parts pivoted to each other. The pintle $c$, which unites the parts, carries a pulley, $d$. The lower section of the frame has a pulley, $e$, mounted on the shaft, which is the extension of the shaft $a$ of the water-wheel, and which has loose bearings in the sides of the said section. The upper section supports the driving-shaft, which carries a pulley, $f$, and has its bearings on one side of the framing $c$, and its other side in the side E of the mill or shop F, through which it protrudes, and has connected to it the main driving-pulley G. H represents a lever pivoted to the side of the shop. Its outer end has pivoted to it an arm or lever, $g$, by which it is connected to the cross-piece $h$ of the rising and falling frame. A lever or arm, $k$, is pivoted to the inner end of lever H, and is notched or pierced so as to catch or fit into a pin or equivalent in a suitable part of the mill or shop, whereby the wheel, being raised or lowered, will be retained in position accordingly. I is a belt or band which passes around the pulley $d$ and pulley $e$. K is a belt or band passing around pulley $f$ and pulley $d$.

The operation is as follows: When the water is at its usual height, as shown in black in the drawing, the wheel will be turned, communicating motion to the pulley $e$, then by means of bands I K and pulleys $d f$ to the driving-pulley G. Should the water rise, then the wheel must be raised. The arm $k$ being depressed, the lever H will raise the frame. The notches or openings in the arm will hold it in position. The shaft $a$ of the wheel following the movement of the wheel will raise the end of the lower section of the pulley-frame, and cause the two sections to be folded. It will be seen that the pintle $c$, being the point of hinging or pivoting, is always the same, whether the two sections are brought closely together or far apart; consequently, the belts I and K possess the same tautness and operate the driving-shaft uniformly, and regardless of the position of the wheel. Should the wheel be raised still higher, or, if lowered consequent to the falling of the stream, the same result is produced. When it is desired to stop the wheel it must be raised entirely out of the water. I thus obviate the necessity of gates, dams, or the like, and consider this part of my invention an important feature.

Having thus described my invention, what I claim as new, and desire to secure by Letters Patent, is—

1. The wheel A mounted on the sliding-frame B, secured to the hinged-pulley frame D, and operating substantially as described for the purpose specified.

2. The hinged-pulley frame D in combination with the wheel A, constructed and operating substantially as described.

To the above I have signed my name this 7th day of June, 1867.

SAMUEL SHIVE.

Witnesses:
J. M. CHAMBERLIN,
C. M. BROWN.